United States Patent [19]
Kukowski

[11] Patent Number: 5,243,869
[45] Date of Patent: Sep. 14, 1993

[54] CAM OPERATED INDEXING DRIVE

[75] Inventor: Paul J. Kukowski, Buffalo Grove, Ill.

[73] Assignee: Emerson Electric Co., Wheeling, Ill.

[21] Appl. No.: 887,530

[22] Filed: May 22, 1992

[51] Int. Cl.$^5$ .................... F16H 27/04; F16H 53/06
[52] U.S. Cl. .................... 74/84 R; 74/567; 74/569
[58] Field of Search ............ 74/84 R, 567, 569, 396, 74/431, 426

[56] References Cited

U.S. PATENT DOCUMENTS

| 3,049,017 | 8/1962 | McDonald et al. | 74/84 |
| 3,181,379 | 5/1965 | Petroff | 74/84 R |
| 3,456,529 | 7/1969 | Petroff | 74/84 R |
| 4,630,493 | 12/1986 | Kato | 74/567 X |
| 4,688,442 | 8/1987 | Seragnoli et al. | 74/426 X |
| 4,955,243 | 9/1990 | Kato et al. | 74/569 X |
| 5,097,718 | 3/1992 | Sahara | 74/84 R |

FOREIGN PATENT DOCUMENTS

| 678504 | 1/1964 | Canada | 74/84 R |
| 1433995 | 4/1976 | United Kingdom | 74/569 |

OTHER PUBLICATIONS

Ferguson Machine Corporation of Indiana, Catalog No. 160 7818 Maplewood Industrial Ct., St. Louis 17, Missouri.

*Primary Examiner*—Vinh T. Luong
*Attorney, Agent, or Firm*—Tilton, Fallon, Lungmus & Chestnut

[57] ABSTRACT

A cam operated indexing drive having a generally cylindrical cam body operatively engaging a follower equipped plate member, the cam body having a radially outwardly projecting rib having dwell portions on opposite sides of the equatorial centerline so that preload forces are balanced.

5 Claims, 3 Drawing Sheets

CAM OPERATED INDEXING DRIVE

BACKGROUND AND SUMMARY OF INVENTION

This invention relates to a cam operated indexing drive and, more particularly, to a type two index right angle or roller gear index cam.

A cam operated index drive resembles a gear box. There is a continuously rotating cam-equipped input shaft which drives an intermittent motion output shaft. The output shaft has a complement of regularly spaced cam followers which mesh with the cam. The cam itself has two distinct sequences. Turning the camshaft while the output shaft is in the motion segment will produce a movement of the output shaft. Turning to the camshaft while the output shaft is in the dwell segment will produce no movement of the output shaft. For a type one cam there is only one motion segment followed by one dwell segment. For type two cams there are two complete sequences of motion and dwell—or see, for example, co-owned U.S. Pat. No. 3,049,017.

Cam operated indexing drives have high mechanical efficiencies and zero backlash. These two features are due to the fact that these indexing drives use roller bearings as cam followers. The rolling elements reduce friction and produce the high efficiency. Backlash is also known as lost motion. Zero backlash is sometimes called a positive connection. The outer shell of the cam follower is compressed or preloaded to provide the zero backlash. The cam follower is structured like an automobile wheel. There is a stud or spindle which is fixed to the follower wheel. There are small rollers which act like the rim of the wheel. Finally the cam follower has an outer shell which acts like the tire. The compressed shell resembles a car tire—it is round in shape but flat at the surface where it contacts the cam.

There are two techniques used to preload the cam followers. One technique is to manufacture the space between the cam followers with a dimension slightly greater than the actual spacing. This is the technique used to preload the right angle style of index cam. The second technique is to mount the input or cam shaft on an eccentric cartridge which allows an adjustment of the center distance between the input and output shafts. By turning the eccentric cartridge the cam is forced or wedged against the cam followers. This is the technique used to preload the roller gear style of index cam. The followers in an indexing cam will enter and leave the cam surface. At the points where they enter and leave the preload is relieved or tapered in order to allow a gradual build-up or preload.

The current technique commonly used by index cam manufacturers for dwells in a type two right angle or roller gear cam involve the alternating use of first two and then three followers in the dwell segments. In the two follower dwell segment there are two followers located symmetrically about the centerline of the cam blank, i.e., the equator of the generally cylindrical body constituting the cam. For the second dwell there are three followers, one on the centerline of the cam blank and the other two located symmetrically about the centerline. Initially, the preload is carried by the first and second followers through the first dwell and first motion. The third follower enters the cam during the end of the first motion but remains unpreloaded or relieved. During the second motion the first follower leaves the cam and preload is then passed to the second and third followers.

For the roller gear cams the preload is produced by decreasing the center distance between the input and output shafts. This decrease produces a deflection of the cam follower shell. But a problem arises when the cam is turned to the three follower dwell. There the same decrease has produced a greater amount of cam follower shell deflection. This alternating scheme does not produce balanced or identical dwell forces. There is some hand fitting required in order to get the correct feel. For the right angle which is preloaded by increasing the thickness of the track between the followers the problem is different. The forces between the two follower dwell are balanced but the forces for the three follower dwell are not. The inaccuracy of the type two right angle units is increased as a result of this.

The inventive follower preload sequence is identical to the current. The difference lies in rotating the two follower dwell by ¼ of the spacing between consecutive followers. This rotation produces a first dwell which is the mirror image of the second dwell. The differences between the two dwells are eliminated along with their associated problems and the cams are statically balanced.

More specifically, the track forming wall means is shifted so that the dwells are on opposite sides of the equatorial centerline and there is no portion of the wall means paralleling the second dwell.

DETAILED DESCRIPTION

Figure 1:
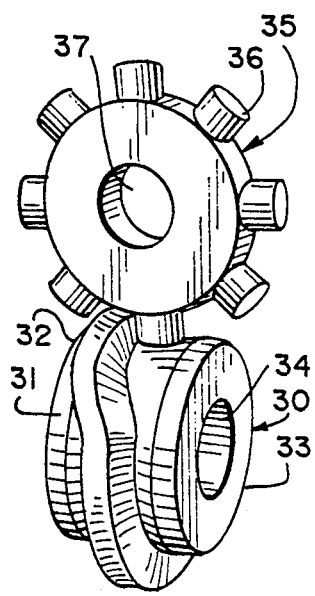
FIG. 1 is a perspective view of a cam operated indexing drive featuring the cam of the invention and being of the roller gear type.

Referring first to FIG. 1, the numeral 30 designates generally a cam body which has a generally cylindrical outer surface 31 and ends 32 and 33. Extending through the body 30 on the axis thereof and between the ends 32, 33 is an axially extending opening 34 adapted to receive an input shaft (not shown in FIG. 1 but which is represented schematically in FIG. 14).

Cooperating with the cam body 30 is a plate member generally designated 35 on which are mounted a plurality of cam followers 36 arranged in equally spaced relation on a circular arc, viz., the cylindrical periphery of the plate member 35. The plate member 35 is equipped with an axially extending opening 37 adapted to receive an output shaft (not shown in FIG. 1 but which is indicated schematically in FIG. 14).

Figure 2:
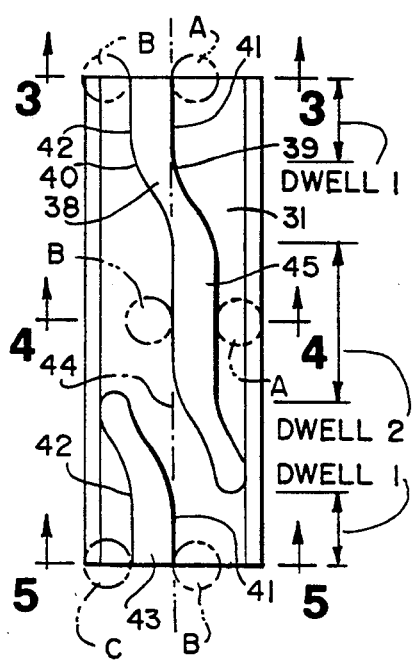
FIG. 2 is a mercator-like projection of the generally cylindrical surface of the cam portion of FIG. 1 so as to represent the same on a planar surface.
Figure 6:
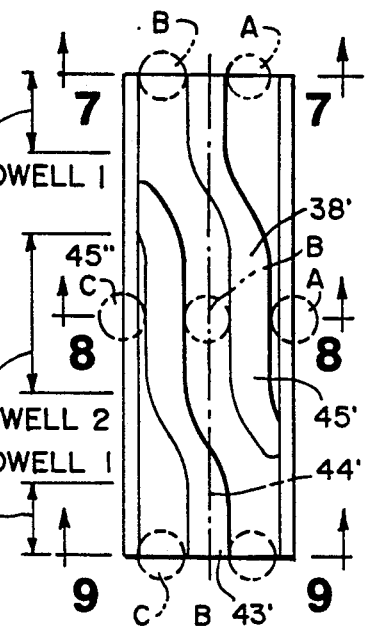
FIG. 6 is a projected view of the surface of a type two cam constructed according to the teachings of the prior art.

As indicated previously, the principal difference between the invention and the prior art resides in the provision of the operative surface of the cam 30. For ease and understanding the invention and the difference thereof from the prior art, FIGS. 2 and 6 are presented side-by-side in the form of mercator-type projections of a cylindrical surface onto a planar surface. In FIG. 2, the numeral 31 again represents the cylindrical surface of the cam body 30. Outstanding from the surface 31 is a wall means 38 in the form of a radially outwardly extending rib which defines tracks 39 and 40 by the opposite sidewalls 41 and 42 relative to the tracks 39 and 40, respectively. The positions of cam followers designated A, B, C are indicated in FIG. 2 and between FIGS. 2 and 6 are designated the two dwell positions. As shown, the first dwell position, viz., DWELL 1, is split into two parts, one upper, and one lower. The normal path of travel of a follower 36 can be appreciated from the B positions in FIG. 2. Initially the follower starts in the lower left at B and follows along the wall 42 to the end of track 40 and thereafter engages wall 41 and proceeds along track 39.

Comparing FIG. 2 and FIG. 6, it will be noted that the placement and length of the wall means or rib 38 is different, notwithstanding the fact that the dwell segments are the same. In FIG. 2, the wall segment 43 providing the DWELL 1 portion of the cycle is to the left of the equatorial center line 44 while the rib segment 45 which develops the second dwell position, viz., DWELL 2 is to the right side of the equatorial center line 44.

Figure 3:
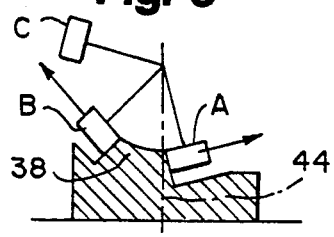
FIG. 3 is a sectional view such as would be seen along the sight line 3—3 of FIG. 2 which corresponds to the first dwell position.
Figure 7:
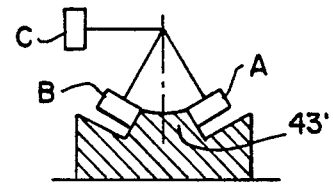
FIGS. 7-9 are cross sectional views taken along the sight lines 7—7, 8—8 and 9—9, respectively, as applied to FIG. 6.
Figure 4:
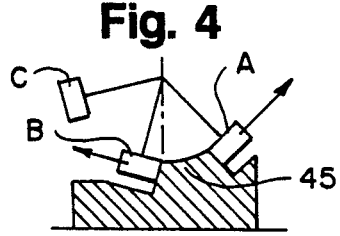
FIG. 4 is a sectional view taken along the sight line 4—4 of FIG. 2 and which represents the arrangement of elements in the second dwell position.
Figure 8:
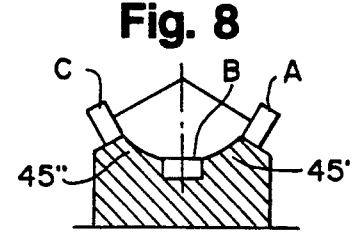
Figure 5:
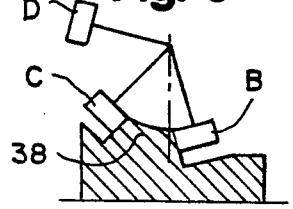
FIG. 5 is a cross sectional view taken along the sight line 5—5 of FIG. 2 and corresponds to the showing in FIG. 3.
Figure 9:
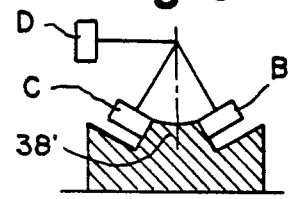
Figure 10:
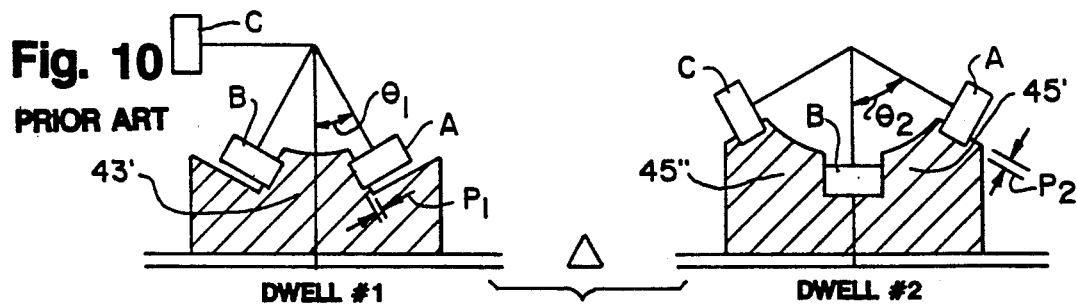
FIG. 10 is a schematic view of the arrangement of followers and cam track in the prior art construction and which corresponds essentially to FIGS. 7 and 8.
Figure 11:
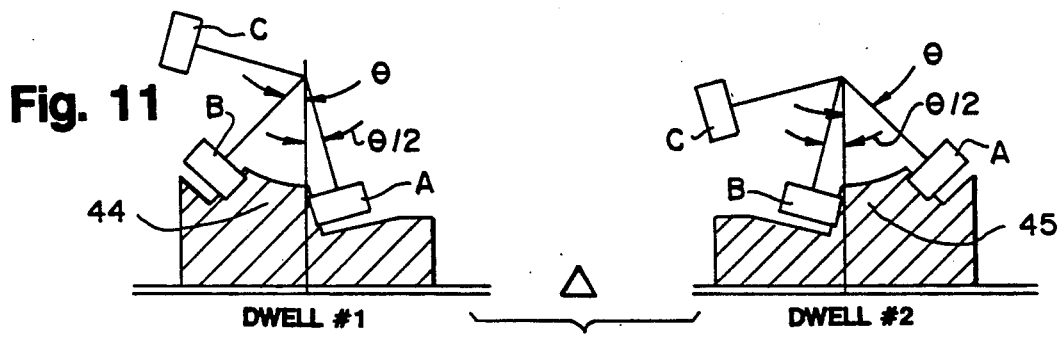
FIG. 11 is a view similar to FIG. 10 but of the inventive arrangement and which corresponds generally to the showings in FIGS. 3 and 4.

In FIG. 6, the outstanding rib is designated 38' and it will be seen that the portion providing the DWELL 1 segment which is designated 43' flanks equatorial center line 44'. Insofar as the DWELL 2 portion of the sequence is concerned, this is developed by two portions of the rib 38'. One portion is designated 45' and the other 45". This makes a difference as can be appreciated from a comparison of FIGS. 3-5 as against 7-9. Immediately apparent is that the angular relationship between followers A and B is the same in FIG. 3 as it is in FIG. 4. This is not true of the angular relationship between followers A and B in FIG. 7 and followers A and C in FIG. 8. This can be better appreciated from a consideration of FIGS. 10 and 11 in combination with FIGS. 12 and 13 (see the second drawing page). Illustrated in both FIGS. 10 and 11 is the available incremental change in center distance between input and output shafts which is designated Δ. The preload is not only governed by the amount of shift in distance between the input and output shafts but also by the angle between the bearing surfaces of the thus preloaded followers. The relationship for preload (P) is:

$$P = \Delta \sin \theta$$

In FIG. 10, the angle between followers A and B in the first dwell segment is approximately one-half of that between followers A and C in the second dwell segment. For example, when $\theta_1$ is 15° and $\theta_2$ is 30°, and the Δ is 0.0030 inches, the value of P changes from 0.0008 inches to 0.0015 inches.

This is not the case with the inventive cam as illustrated in FIG. 11 where the angle between the adjacent followers remains the same for both dwell segments.

Figure 12:
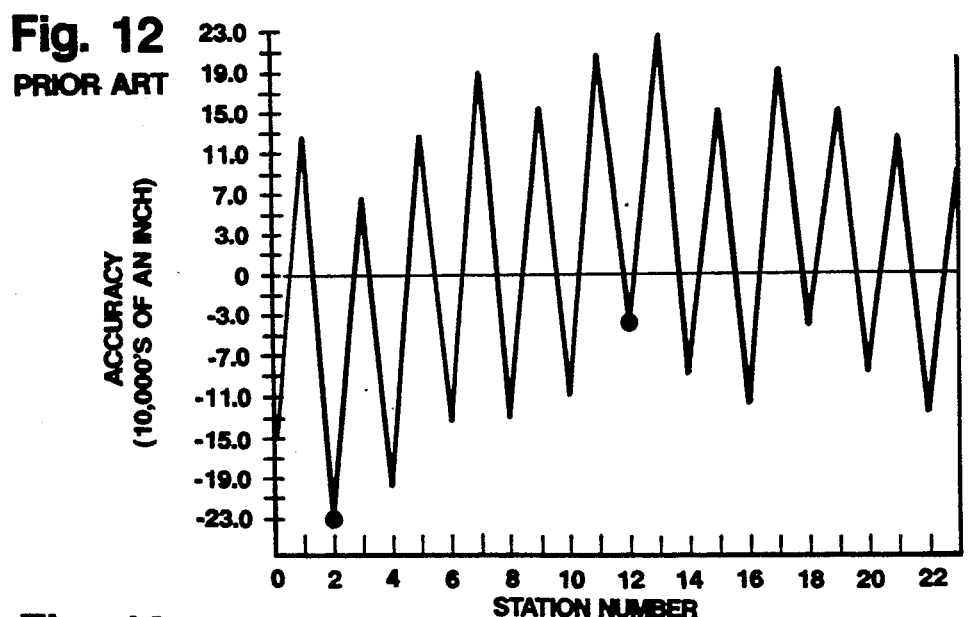
FIG. 12 is a chart of accuracy of an application of the prior art cam with the ordinate being measured in ten thousandths of of inch and the abscissa representing a station number in the application.
Figure 13:
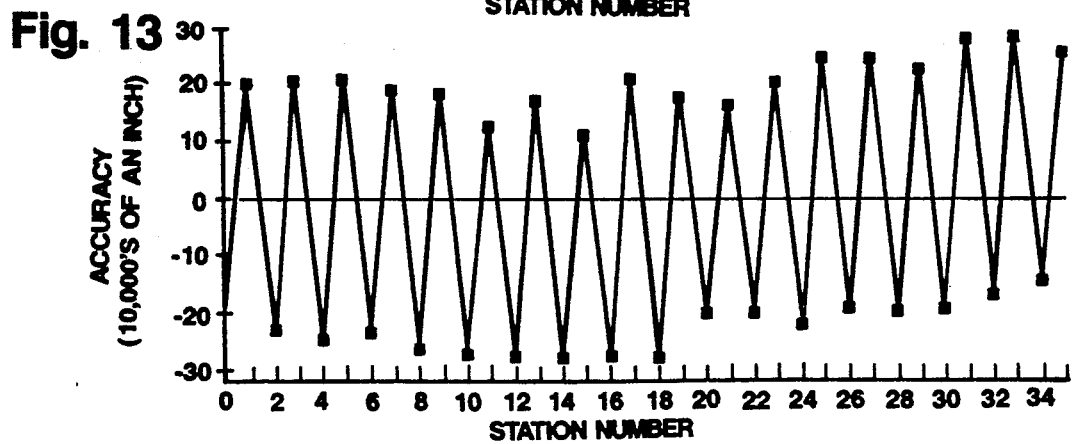
FIG. 13 is a chart similar to that of FIG. 12 but utilizing the inventive cam.

This has resulted in a substantial improvement in accuracy. This is illustrated by the charts of FIGS. 12 and 13. In FIG. 12, the excursions above zero range from 5 at station 3 to 23 at station 13 while the negative excursions range from minus 4 at station 12 to minus 23 at station 2. So the average positive swing or excursion is 18 and the negative is 19. These measurements were conducted on a Brown & Sharpe coordinate measuring machine on a CAMCO Model No. 601RDM24H24-180. The measuring machine measures accuracy in tens of thousandths of an inch for each one of the stations. Using the same measuring instrument but employing the inventive cam resulted in the showing of the chart of FIG. 13. There, the highest positive excursion was 27 and the least was 11 or a range of 16. On the negative side, the greatest excursion was minus 27 and the least was minus 14 or a difference of 13. Even these minor differences can be significantly important and advantageous when precision of fixating is involved.

Figure 14:
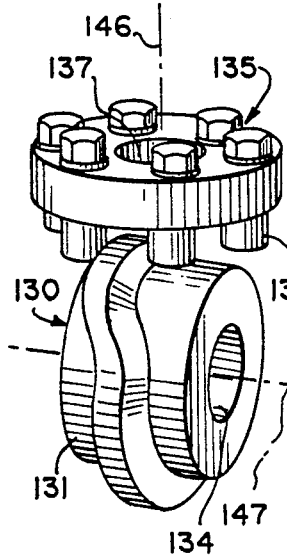
FIG. 14 is a perspective view, partially schematic, of a cam operated indexing drive of the right angle type.

Now turning to the third drawing sheet and in particular FIG. 14, the numeral 130 designates generally the cam body which is substantially identical to that designated 30 in FIG. 1. The cam body is equipped with a cylindrical outer surface 131 (see also FIG. 15) from which extends radially outwardly a wall means or rib 138.

Differing in FIG. 14 from the showing of FIG. 1 is the plate member generally designated 135 and which carries the followers 136. The plate member 135 is of the type employed in connection with a right angle indexer as contrasted to a roller gear indexer. The plate member 135 is equipped with an axial opening 137 into which is inserted a output shaft schematically represented at 146.

In similar fashion, the cam body 130 is equipped with an axially extending opening 134 in which is mounted the input shaft schematically represented as at 147. Omitted for clarity and ease of presentation is the usual housing confining the various parts, including bearings, etc.

Figure 15:
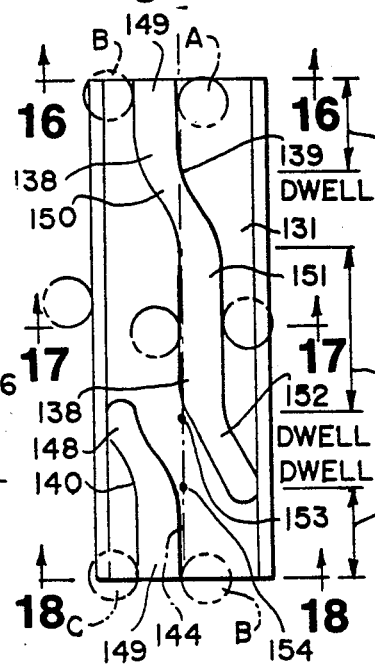
FIG. 15 is a projected view of the cylindrical surface of the cam of FIG. 14.
Figure 19:
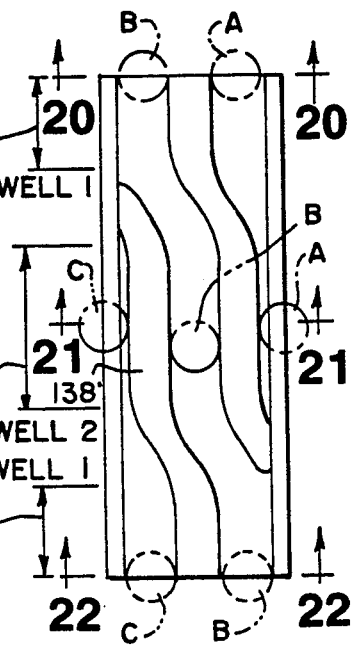
FIG. 19 is a projected view of the cam cylindrical surface of the prior art and which is seen to be similar to FIG. 6.
Figure 16:
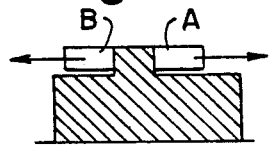
FIGS. 16–18 are sectional views taken along the sight lines 16—16, 17—17 and 18—18, respectively.
Figure 20:
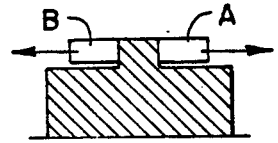
FIGS. 20-22 are sectional views taken along the sight lines 20—20, 21—21 and 22—22, respectively of FIG. 19.
Figure 17:
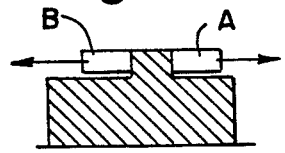
Figure 21:
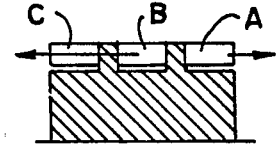
Figure 18:
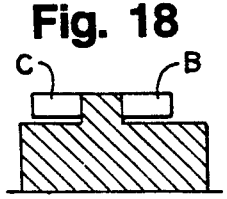
Figure 22:
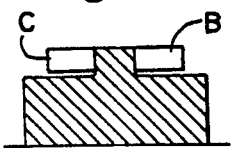

A comparison of FIGS. 15 and 19 and, in particular the ribs 138 and 138' reveals that the description given previously above relative to FIGS. 2 and 6 applies. There is a difference however in the orientation of the preloading forces as can be appreciated from a comparison of FIGS. 16 and 17 relative to the invention and FIGS. 19 and 20 relative to the prior art. For example, the preload forces are the same for dwell segments 1 and 2 in FIGS. 16 and 17 whereas they are substantially unbalanced in FIGS. 19 and 20 relative to the prior art type of cam.

Referring now to FIG. 15, it will be seen that the wall means or outstanding rib 138 includes in sequence, an entry segment 148, a first dwell segment 149 (shown in parts above and below), a cross-over segment 150, a second dwell segment 151 and an exit segment 152. The first dwell segment 149 extends generally parallel to and on one side of the equatorial centerline 144 while the second dwell segment 151 also extends generally parallel to the equatorial centerline 144 but is on the other side thereof from the first dwell segment. It will be noted that the entry and exit segments 148 and 152 circumferentially overlap each other.

Still further, the track consists of the portion 140 on one side of the rib 138 and the portion 139 on the other side of the rib 138. The upstream or entering end of the rib 138 which provides the entry segment 148 is generally axially aligned with that portion of the exit segment 152 which is nearest the equatorial centerline 144 as indicated by the point 153. In similar fashion, the track has an exit generally axially aligned with the portion of the entry segment 148 nearest the equatorial centerline as illustrated by the point designated 154.

With the inventive arrangement only two of the followers 36 or 136 are in contact with the wall means or rib 38, 138 at any one time.

Among the advantages flowing from the use of the invention is that cam follower life is improved. This stems from the fact that there is less rotation per cycle. There is also less hand-grinding required during assembly and, in particular, it was not possible to make miniature type two indexers without substantial grinding. Generally, the invention reduces manufacturing and assembly time, has less cam surface has to be cut and less surface needs to be hand ground. All of these advantages accrue plus the dynamic balancing of preload forces.

While in the foregoing specification a detailed description of the invention has been set down for the purpose of illustration, many variations in the details hereingiven may be made by those skilled in the art without departing from the spirit and scope of the invention.

I claim:

1. A cam body for a type two right angle or roller gear cam indexing drive comprising a body having a generally cylindrical outer surface extending between body ends, said body having an equatorial centerline between said ends, an opening extending axially through said body from one end to the other for the receipt of an input shaft, wall means integral with said outer surface and extending generally circumferentially for engagement with cam followers extending cam follower track, said wall means having in sequence an entry segment adjacent one body end, a first dwell segment extending generally parallel to and on one side of said equatorial centerline, a cross-over segment, a second dwell segment extending generally parallel from said first dwell segment, and an exit segment adjacent the other body end.

2. The structure of claim 1 in which said wall means entry and exit segments circumferentially overlap each other.

3. The structure of claim 2 in which entry at the end of said entry segment and an exit at the end of said exit segment, said entry being generally axially aligned with the portion of said exit segment nearest said equatorial centerline, said exit being generally axially aligned with the portion of said entry segment nearest said equatorial centerline.

4. A cam operated indexing drive comprising a generally cylindrical cam body having a pair of ends, a wall means on said body cylindrical surface having an entry adjacent one body end and an exit adjacent the other body end, said body having an axially extending opening for receipt of an input shaft, a plate member operably associated with said cam body and equipped with a plurality of followers equally spaced on a circular arc, said followers being sequentially received in said track, said plate member having an opening at the center of said circular arc for receipt of an output shaft, said wall means between said entry and exit having in sequence a first dwell segment, a crossover segment, and a second dwell segment, said second dwell segment being defined by wall means arranged relative to said plat member so that only two of said followers are in contact with said wall means at any one time.

5. The structure of claim 4 in which said body has an equatorial centerline intermediate said body ends, said first and second dwell segments being on opposite sides of said equatorial centerline and generally abutting said equatorial centerline.

* * * * *